(12) United States Patent
Yoneyama

(10) Patent No.: US 6,353,505 B1
(45) Date of Patent: Mar. 5, 2002

(54) ZOOM LENS SYSTEM

(75) Inventor: Shuji Yoneyama, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/576,251

(22) Filed: May 24, 2000

(30) Foreign Application Priority Data

May 25, 1999 (JP) ............................................ 11-144820

(51) Int. Cl.$^7$ ................................................ G02B 15/14
(52) U.S. Cl. ...................................... 359/687; 359/684
(58) Field of Search ................................. 359/684, 686, 359/687, 690, 774

(56) References Cited

U.S. PATENT DOCUMENTS

| | | | | |
|---|---|---|---|---|
| 4,653,872 A | * | 3/1987 | Takahashi | 359/687 |
| 4,952,039 A | | 8/1990 | Ito | 359/687 |
| 5,000,551 A | * | 3/1991 | Shibayama | 359/687 |
| 5,061,053 A | | 10/1991 | Hirakawa | 359/690 |
| 5,285,317 A | * | 2/1994 | Uzawa | 359/687 |
| 5,568,321 A | | 10/1996 | Ogawa et al. | 359/686 |
| 5,572,276 A | * | 11/1996 | Hirkawa | 359/684 |
| 5,666,229 A | * | 9/1997 | Ohtake | 359/683 |
| 5,699,198 A | | 12/1997 | Inadome et al. | 359/684 |
| 5,815,321 A | | 9/1998 | Shimo | 359/687 |
| 5,978,152 A | * | 11/1999 | Okayama et al. | 359/687 |
| 6,118,592 A | * | 9/2000 | Kohno et al. | 359/686 |

FOREIGN PATENT DOCUMENTS

| JP | 4-149402 | 5/1992 |
|---|---|---|
| JP | 6-130299 | 5/1994 |
| JP | 8-86963 | 4/1996 |
| JP | 8-248319 | 9/1996 |

* cited by examiner

*Primary Examiner*—Evelyn A Lester
(74) *Attorney, Agent, or Firm*—Greenblum & Bernstein, P.L.C.

(57) ABSTRACT

A zoom lens system includes a positive first lens group, a negative second lens group, a positive third lens group, and a positive fourth lens group. Upon zooming, the first through fourth lens groups move toward the object so that the distance between the first and the second lens groups becomes longer, the distances among the second, the third and the fourth lens groups become shorter. The third lens group includes a positive 3-1st lens element, a positive 3-2nd lens element, and a negative 3-3rd lens element. The zoom lens system satisfies the following condition:

$$-1.8 < \varnothing r_{3\text{-}3\text{-}1}/\varnothing w < -1.1 \ldots \quad (1)$$

wherein $\varnothing r_{3\text{-}3\text{-}1}$ designates the surface power of the object-side surface of the negative 3-3rd lens element of the third lens group; and $\varnothing w$ designates the power of the entire lens system at the short focal length extremity.

5 Claims, 13 Drawing Sheets

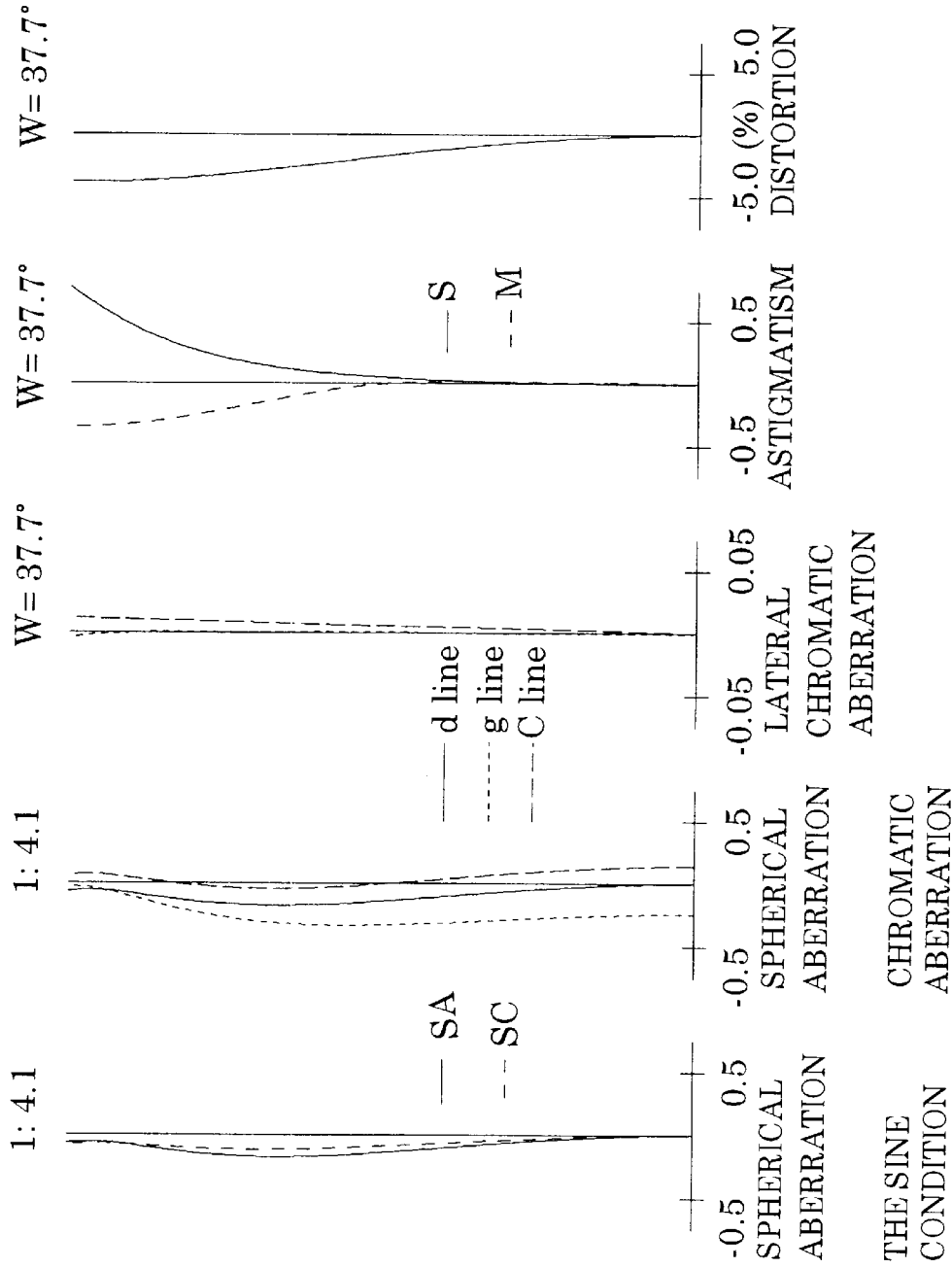

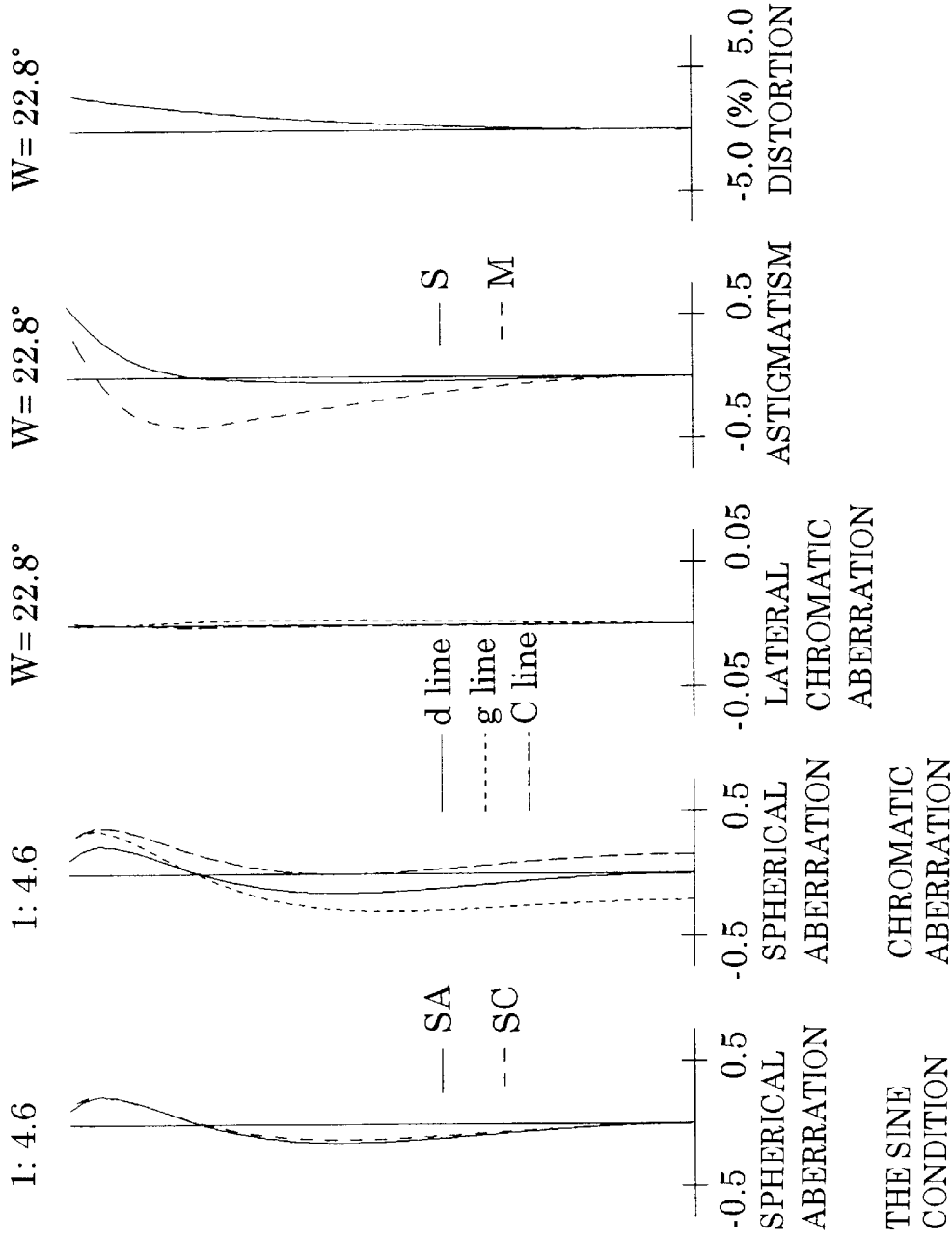

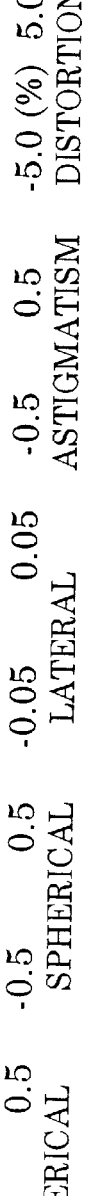
Fig. 8A Fig. 8B Fig. 8C Fig. 8D Fig. 8E

ZOOM LENS SYSTEM

BACKGROUND OF THE INVENTION

1. Field of the Invention

The present invention relates to a zoom lens system suitable for a photo-taking camera, video and electronic still cameras and the like.

2. Description of the Related Art

As a zoom lens system having an angle-of-view of about 75° at the short focal length extremity and a zoom ratio of more than 3.7, the ones, for example, disclosed in Japanese Unexamined Patent Publication (JPUEPP) No. Hei-6-130299, JPUEPP No. Hei-4-149402, and U.S. Pat. No. 5,815,321 are known in the art. However, the zoom lens system taught in JPUEPP No. Hei-6-130299 has required high production costs, since (i) the number of lens elements constituting the zoom lens system is relatively larger, i.e., fourteen lens elements, and (ii) an F-number is also relatively larger, i.e., about 5 to 8. If this zoom lens system is used in a single lens reflex (SLR) camera, focusing becomes difficult due to a darker image, i.e., a larger F-number.

In the zoom lens systems taught in JPUEPP Nos. Hei-4-149402 and U.S. Pat. No. 5,815,321, the number of lens elements are smaller; however, higher production costs are still required since aspherical surfaces are employed in order to enhance optical performance.

At least the following process and devices are known in the art to form aspherical surfaces:

(i) a machining process through which an aspherical surface is directly formed on a glass lens element;
(ii) the so-called hybrid molding dies through which a thin resin layer is bonded on a glass lens element; and
(iii) the molding dies through which an entire lens element with an aspherical surface is formed.

It is noted that the machining process needs machinery with high performance, and the hybrid molding dies and the molding dies need to be formed in the shape of an aspherical surface. Any one of these process and devices therefore requires higher costs.

Furthermore, in the inspection process for lens elements, spherical surfaces can be inspected with a Newton gauge which has high precision, and is a simple and convenient inspection means; however, aspherical surfaces need specific inspection means in accordance with the surface shapes thereof, which is generally time consuming and costly.

SUMMARY OF THE INVENTION

It is an object of the present invention to provide a four-lens-group zoom lens system, with a small number of lens elements, which has high optical performance and is inexpensive.

In order to achieve the above-mentioned object, there is provided a zoom lens system including a positive first lens group, a negative second lens group, a positive third lens group, and a positive fourth lens group, in this order from the object. Upon zooming from the short focal length extremity to the long focal length extremity, the first through fourth lens groups move toward the object so that the distance between the first and the second lens groups becomes longer, the distance between the second and the third lens groups becomes shorter, and the distance between the third and the fourth lens groups becomes shorter. The third lens group includes a positive 3-1st lens element, a positive 3-2nd lens element having a large-curvature convex surface facing toward the object, and a negative 3-3rd lens element having a large-curvature concave surface facing toward the object, in this order from the object. The zoom lens system satisfies the following condition:

$$-1.8 < \phi r_{3\text{-}3\text{-}1}/\phi w < -1.1 \qquad (1)$$

wherein $\phi r_{3\text{-}3\text{-}1}$ designates the surface power of the object-side surface of the negative 3-3rd lens element of the third lens group; and $\phi w$ designates the power of the entire lens system at the short focal length extremity.

The fourth lens group preferably includes a positive 4-1st lens element having a large-curvature convex surface facing toward the image, a positive 4-2nd lens element, and a negative 4-3rd lens element having a large-curvature concave surface facing toward the object, in this order from the object. The zoom lens system preferably satisfies one of, or both condition (2) and condition (3):

$$-1.8 < \phi 4air/\phi w < -1.2 \qquad (2)$$

$$SF4air < -1.1 \qquad (3)$$

wherein $$\phi 4air = \phi_{4\text{-}2\text{-}2} + \phi_{4\text{-}3\text{-}1} - d_{4\text{-}4} \times \phi_{4\text{-}2\text{-}2} \times \phi_{4\text{-}3\text{-}1}$$

$d_{4\text{-}4}$ designates the distance between the positive 4-2nd lens element and the negative 4-3rd lens element;

$$\phi_{4\text{-}2\text{-}2} = (1 - n_{4\text{-}2})/r_{4\text{-}2\text{-}2}$$

$$\phi_{4\text{-}3\text{-}1} = (n_{4\text{-}3} - 1)/r_{4\text{-}3\text{-}1}$$

$n_{4\text{-}2}$ designates the refractive index of the positive 4-2nd lens element;

$n_{4\text{-}3}$ designates the refractive index of the negative 4-3rd lens element;

$$SF4air = (r_{4\text{-}3\text{-}1} + r_{4\text{-}2\text{-}2})/(r_{4\text{-}3\text{-}1} - r_{4\text{-}2\text{-}2});$$

$r_{4\text{-}2\text{-}2}$ designates the radius of curvature of the image-side surface of the positive 4-2nd lens element; and $r_{4\text{-}3\text{-}1}$ designates the radius of curvature of the object-side surface of the negative 4-3rd lens element.

In the zoom lens system according to the present invention, upon focusing from an object at an infinite photographing distance (i.e, a camera-to-object distance) to an object at the closest photographing distance, the second lens group is preferably moved toward the object. According to this arrangement, optical performance for closer photographing distances can suitably be improved.

The present disclosure relates to subject matter contained in Japanese Patent Application No. Hei-11-144820 (filed on May 25, 1999) which is expressly incorporated herein by reference in its entirety.

BRIEF DESCRIPTION OF THE DRAWINGS

The invention will be discussed below in detail with reference to the accompanying drawings, in which:

FIGS. 6A, 6B, 6C, 6D and 6E are aberration diagrams of the lens arrangement shown in FIG. 5 at the short focal length extremity;

FIGS. 7A, 7B, 7C, 7D and 7E are aberration diagrams of the lens arrangement shown in FIG. 5 at an intermediate focal length;

FIGS. 8A, 8B, 8C, 8D and 8E are aberration diagrams of the lens arrangement shown in FIG. 5 at the long focal length extremity;

DESCRIPTION OF THE PREFERRED EMBODIMENTS

Figure 13:
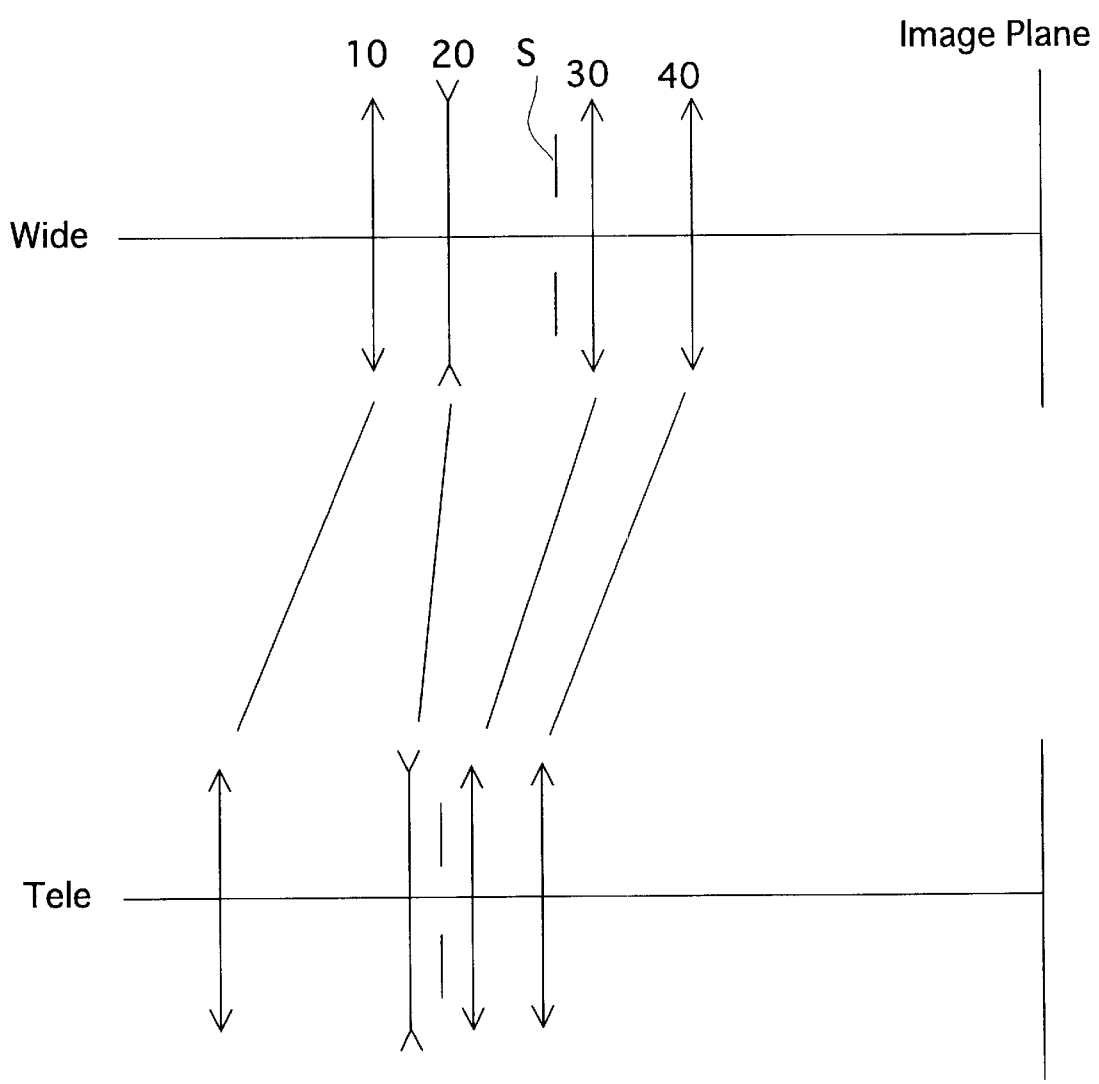
FIG. 13 shows the lens-group-moving paths zoom of a zoom lens system according to the present invention.

The zoom lens system according to the present invention includes a positive first lens group 10, a negative second lens group 20, a diaphragm S, a positive third lens group 30, and a positive fourth lens group 40, in this order from the object, as shown in the lens-group moving paths of FIG. 13. Furthermore, the third lens group 30 includes a positive 3-1st lens element, a positive 3-2nd lens element having a large-curvature convex surface facing toward the object, a negative 3-3rd lens element having a large-curvature concave surface facing toward the object, in this order from the object. The fourth lens group 40 includes a positive 4-1st lens element having a large-curvature convex surface facing toward the image, a positive 4-2nd lens element, and a negative 4-3rd lens element having a large-curvature concave surface facing toward the object, in this order from the object. In this zoom lens system of four-lens-group arrangement, upon zooming from the short focal length extremity to the long focal length extremity, the first through fourth lens groups move toward the object so that the distance between the first lens group 10 and the second lens group 20 becomes longer, the distance between the second lens group 20 and the third lens group 30 becomes shorter, and the distance between the third lens group 30 and the fourth lens group 40 becomes shorter. The diaphragm S moves integrally with the third lens group 30.

A zoom lens system of four-lens-group arrangement, such as the one explained, is advantageous for obtaining a miniaturized zoom lens system with a high zoom ratio. However, it is known that if a zoom lens system with a high zoom ratio is miniaturized, the power of each lens group becomes stronger, as a result, aberrations occur therein. Particularly, in the third lens group 30 and the fourth lens group 40, spherical aberration is largely occurred.

Condition (1) is for correcting spherical aberration. In order to correct negative spherical aberration which is largely occurred in the positive 3-1st lens element and the positive 3-2nd element, the object-side surface of the negative 3-3rd lens element is formed to have a strong negative power.

If the negative power becomes weaker to the extent that $\varnothing r_{3-3-1}/\varnothing w$ exceeds the upper limit of condition (1), positive spherical aberration occurred on the object-side surface of the negative 3-3rd lens element becomes smaller, so that spherical aberration in the entire zoom lens system cannot be corrected.

If the negative power becomes stronger to the extent that $\varnothing r_{3-3-1}/\varnothing w$ exceeds the lower limit of condition (1), positive spherical aberration largely occurs, so that spherical aberration is overcorrected, or spherical aberration of higher-order occurs.

Condition (2) specifies the power of the so-called air lens element between the positive 4-2nd lens element and the negative 4-3rd lens element.

If the negative power of the air lens element becomes weaker to the extent that $\varnothing 4air/\varnothing w$ exceeds the upper limit of condition (2), positive spherical aberration occurred on the object-side surface of the negative 4-3rd lens element becomes smaller, and negative spherical aberration occurred on the image-side surface of the positive 4-2nd lens element becomes larger. As a result, spherical aberration is undercorrected, since negative spherical aberration occurs in the entire zoom lens system.

If the negative power of the air lens element becomes stronger to the extent that $\varnothing 4air/\varnothing w$ exceeds the lower limit of condition (2), negative spherical aberration occurred on the image-side surface of the positive 4-2nd lens element becomes smaller, and positive spherical aberration occurred on the object-side surface of the negative 4-3rd lens element becomes larger. As a result, spherical aberration is overcorrected, or spherical aberration of higher-order occurs, since positive spherical aberration occurs in the entire zoom lens system.

Condition (3) specifies the configuration of the air lens between the positive 4-2nd lens element and the negative 4-3rd lens element. The air lens is defined as the shape of the space formed between two lens elements. In other words, condition (3) indicates that the air lens element is in the form of a meniscus lens element having a concave surface facing toward the object. Further, condition (3) is for correcting spherical aberration, and both condition (2) and condition (3) are preferably satisfied at the same time. By satisfying condition (3), the radius of curvature of the negative powered image-side surface of air lens element is smaller than that of the positive powered object-side surface thereof. As a result, the air lens element as a whole has a negative power, and positive spherical aberration occurs thereon, and thereby spherical aberration in the entire zoom lens system can be corrected. Since the air lens element is positioned in the vicinity of the image plane, and away from the diaphragm S provided between the second lens group 20 and the third lens group 30, off-axis rays run above on-axis rays when these rays pass through the air lens element. In other words, the off-axis rays pass through the periphery of the air lens element. According to condition (3), an angle of incidence of an off-axis ray becomes smaller, and thereby coma and astigmatism caused by off-axis rays can be maintained relatively smaller.

If SF4air exceeds the upper limit of condition (3), an angle of incidence of an off-axis ray on the image-side surface of the positive 4-2nd lens element becomes larger, so that coma and astigmatism caused by off-axis rays cannot be maintained smaller.

Furthermore, in the zoom lens system according to the present invention, by arranging the second lens group 20 to be a focusing lens group, optical performance for closer photographing distances can suitably be improved. In other words, against a large magnification change due to zooming, the second lens group 20 is originally designed to reduce fluctuations of aberrations over the entire zooming range defined by the short and long focal length extremities, and to maintain aberrations adequately in the entire zoom lens system. When the second lens group 20 having the above functions is further arranged to perform focusing, a small magnification change due to focusing does not substantially fluctuate aberrations, and optical performance for closer photographing distances can therefore be improved.

If the first lens group 10 is arranged to perform focusing, the size thereof has to be made larger for maintaining peripheral illumination. Unlike the first lens group 10, the second lens group 20 is more suitable for a focusing lens group, since the second lens group 20 with a large magnification has high sensitivity on focusing, a traveling distance thereof can be reduced, and thereby the first lens group 10 does not have to be moved toward the object. As a result, the size of the first lens group 10 can be miniaturized.

Specific numerical examples will herein be discussed. In the diagrams of spherical aberration, SA designates spherical aberration, SC designates the sine condition. In the diagrams of chromatic aberration (axial chromatic aberration) represented by spherical aberration, the solid line and the two types of dotted lines respectively indicate spherical aberration with respect to the d, g and C lines. Also, in the diagrams of lateral chromatic aberration, the solid line and the two types of dotted lines respectively indicate magnification with respect to the d, g and C lines. S designates the sagittal image, and M designates the meridional image. In the tables, $F_{NO}$ designates the F-number, f designates the focal length of the entire lens system, W designates the half angle-of-view (°), $f_B$ designates the back focal distance, r designates the radius of curvature, d designates the lens thickness or space between lens surfaces, $N_d$ designates the refractive index of the d line, and v designates the Abbe number.

Embodiment 1

Figure 1:
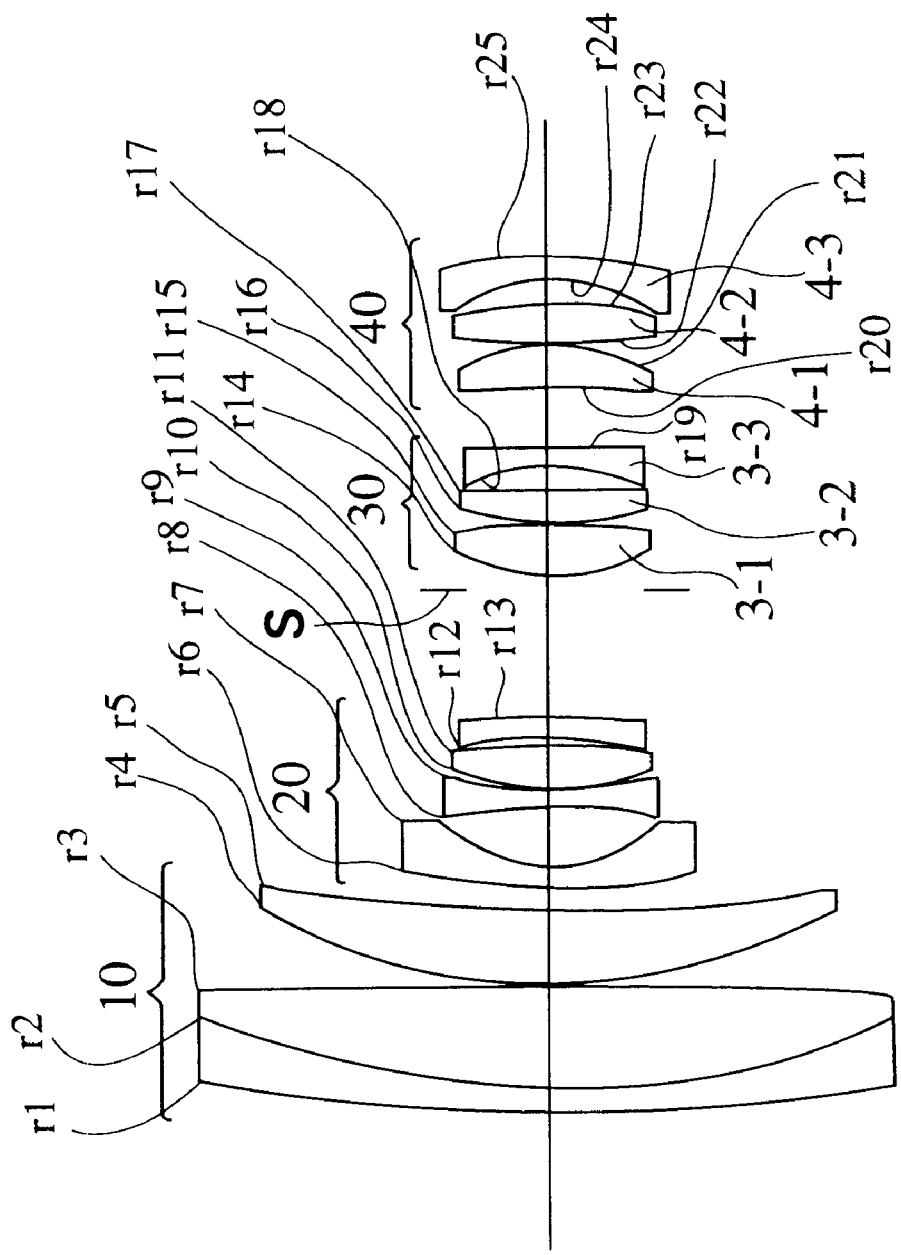
FIG. 1 is a lens arrangement of a first embodiment of a zoom lens system according to the present invention.
Figure 2:
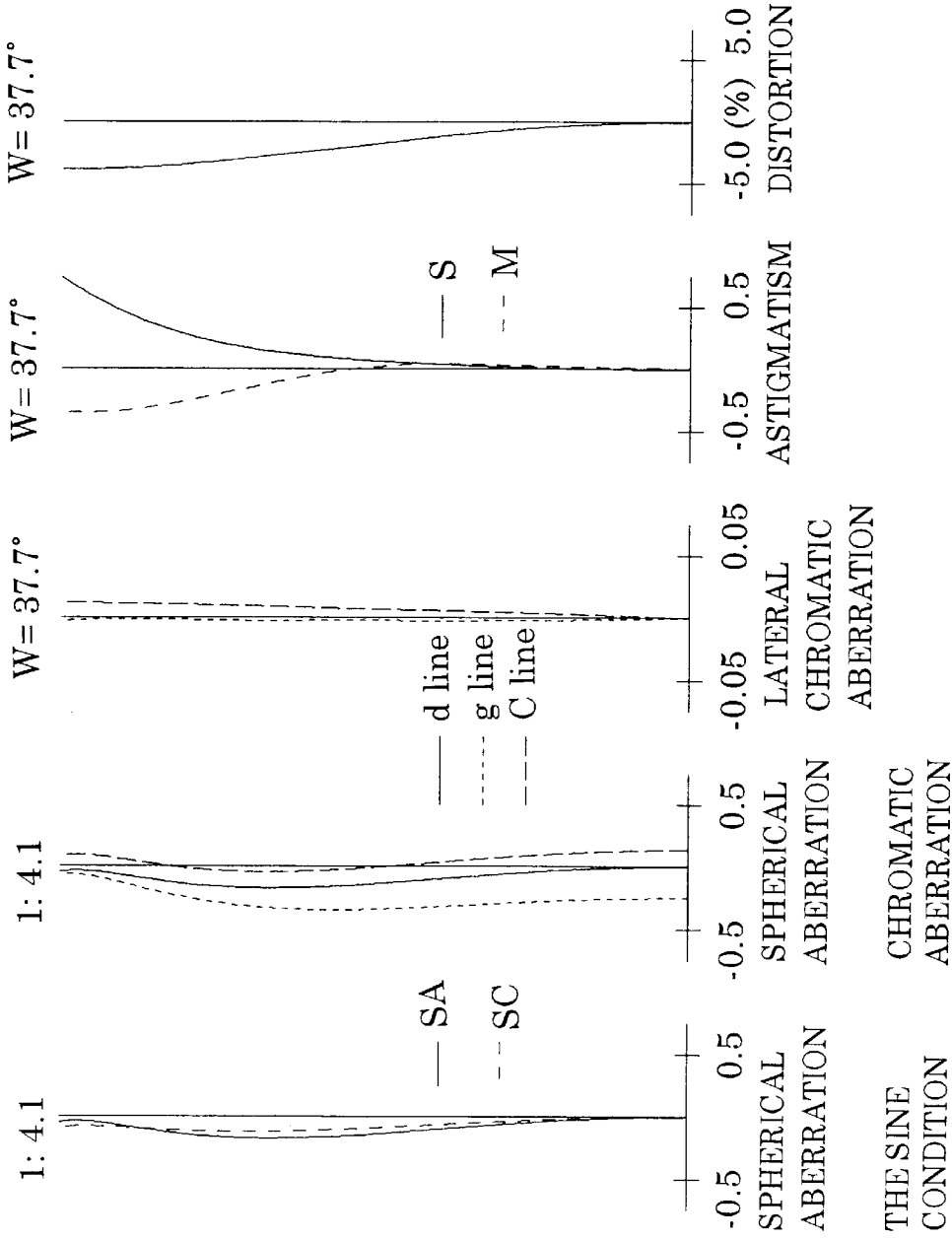
FIGS. 2A, 2B, 2C, 2D and 2E are aberration diagrams of the lens arrangement shown in FIG. 1 at the short focal length extremity.
Figure 3:
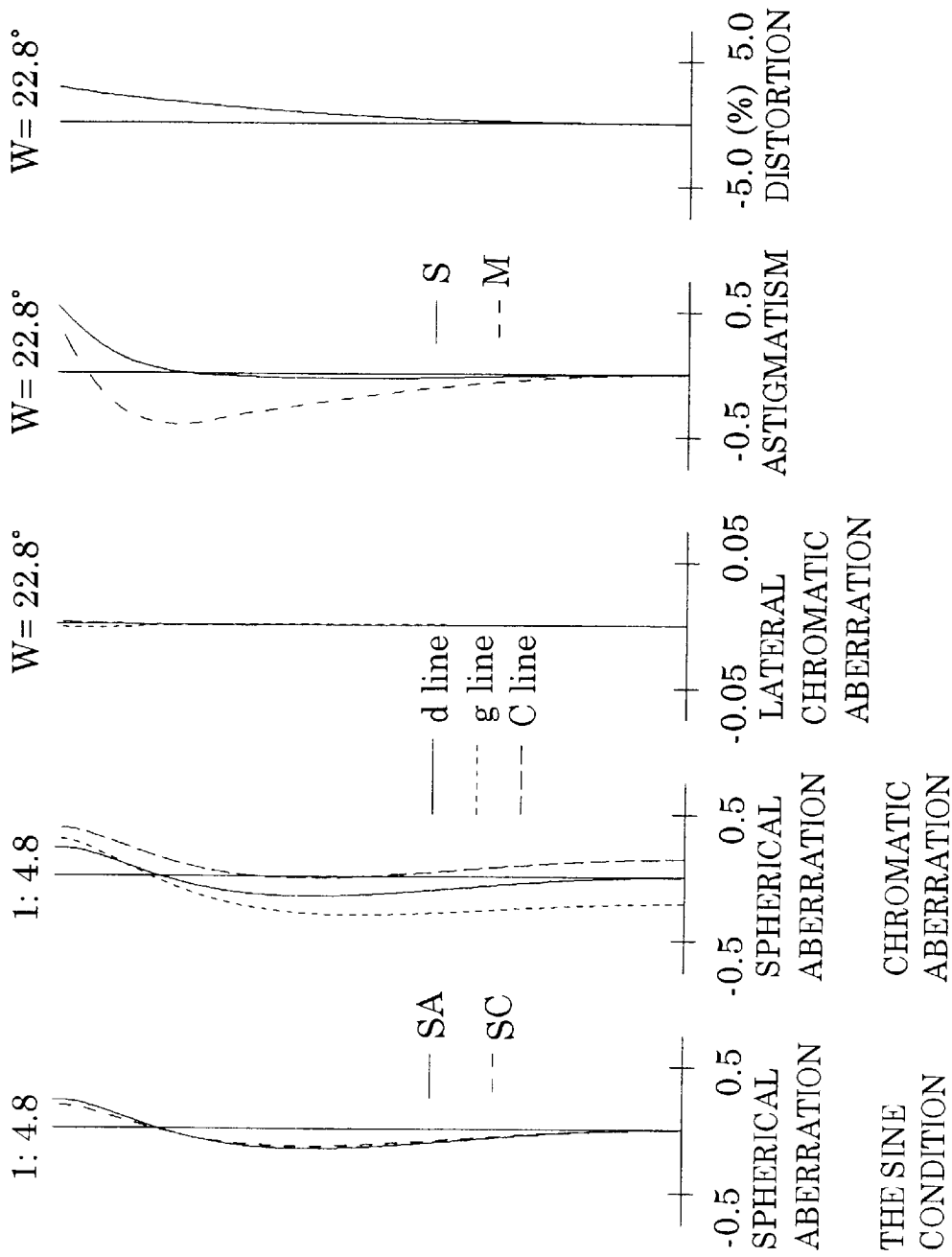
FIGS. 3A, 3B, 3C, 3D and 3E are aberration diagrams of the lens arrangement shown in FIG. 1 at an intermediate focal length.
Figure 4:
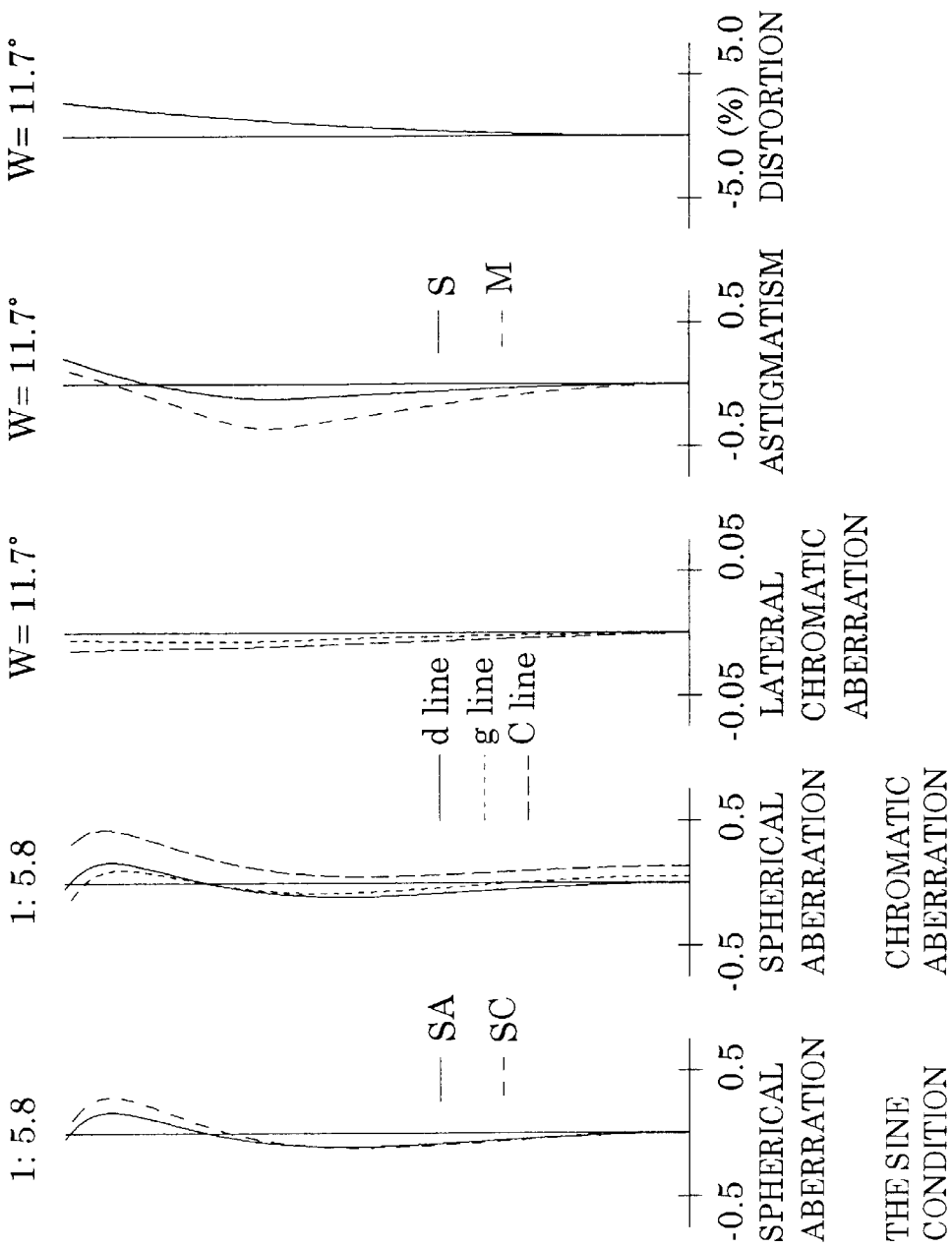
FIGS. 4A, 4B, 4C, 4D and 4E are aberration diagrams of the lens arrangement shown in FIG. 1 at the long focal length extremity.

FIGS. 1 through 4 show the first embodiment of the zoom lens system according to the present invention. FIG. 1 is a lens arrangement of the first embodiment. The first lens group 10 includes a cemented sub lens group having a negative lens element and a positive lens element, and a positive lens element, in this order from the object. The second lens group 20 includes a negative lens element, a negative lens element, a positive lens element, and a negative lens element, in this order from the object. The third lens group 30 includes a positive 3-1st lens element, a positive 3-2nd lens element having a large-curvature convex surface facing toward the object, and a negative 3-3rd lens element having a large-curvature concave surface facing toward the object, in this order from the object. The fourth lens group 40 includes a positive 4-1st lens element having a large-curvature convex surface facing toward the image, a positive 4-2nd lens element, and a negative 4-3rd lens element having a large-curvature concave surface facing toward the object, in this order from the object. FIGS. 2A through 2E, FIGS. 3A through 3E, and FIGS. 4A through 4E show aberration diagrams of the lens arrangement of FIG. 1, respectively at the short focal length extremity, at an intermediate focal length, and at focal length extremity. Table 1 shows the numerical data thereof.

TABLE 1

$F_{NO} = 1:4.1–4.8–5.8$
f = 29.07–49.99–101.33 (Zoom Ratio: 3.49)
W = 37.7–22.8–11.7
$f_B = 38.00–47.50–61.77$

| Surface No. | r | d | Nd | v |
|---|---|---|---|---|
| 1 | 144.829 | 1.80 | 1.84666 | 23.8 |
| 2 | 60.203 | 7.40 | 1.60311 | 60.7 |
| 3 | −862.771 | 0.10 | — | — |
| 4 | 42.322 | 5.30 | 1.69680 | 55.5 |
| 5 | 113.809 | 1.81–15.13–28.77 | — | — |
| 6 | 49.562 | 1.50 | 1.80400 | 46.6 |
| 7 | 11.232 | 4.36 | — | — |
| 8 | −41.468 | 1.30 | 1.80400 | 46.6 |

TABLE 1-continued $F_{NO} = 1:4.1–4.8–5.8$
f = 29.07–49.99–101.33 (Zoom Ratio: 3.49)
W = 37.7–22.8–11.7
$f_B = 38.00–47.50–61.77$

| Surface No. | r | d | Nd | v |
|---|---|---|---|---|
| 9 | 29.517 | 0.10 | — | — |
| 10 | 20.276 | 3.05 | 1.84666 | 23.8 |
| 11 | −71.650 | 0.81 | — | — |
| 12 | −23.914 | 1.30 | 1.77250 | 49.6 |
| 13 | −106.460 | 9.37–5.51–1.00 | — | — |
| Diaphragm | ∞ | 1.00 | — | — |
| 14 | 14.924 | 3.90 | 1.51742 | 52.4 |
| 15 | −43.581 | 0.10 | — | — |
| 16 | 25.921 | 2.40 | 1.62299 | 58.2 |
| 17 | −552.511 | 1.59 | — | — |
| 18 | −15.687 | 1.50 | 1.84666 | 23.8 |
| 19 | −494.584 | 4.32–3.36–2.69 | — | — |
| 20 | −66.140 | 3.03 | 1.66998 | 39.3 |
| 21 | −14.092 | 0.10 | — | — |
| 22 | 51.733 | 3.00 | 1.48749 | 70.2 |
| 23 | −27.579 | 1.92 | — | — |
| 24 | −11.596 | 1.60 | 1.83481 | 42.7 |
| 25 | −32.357 | — | — | — |

Embodiment 2

Figure 5:
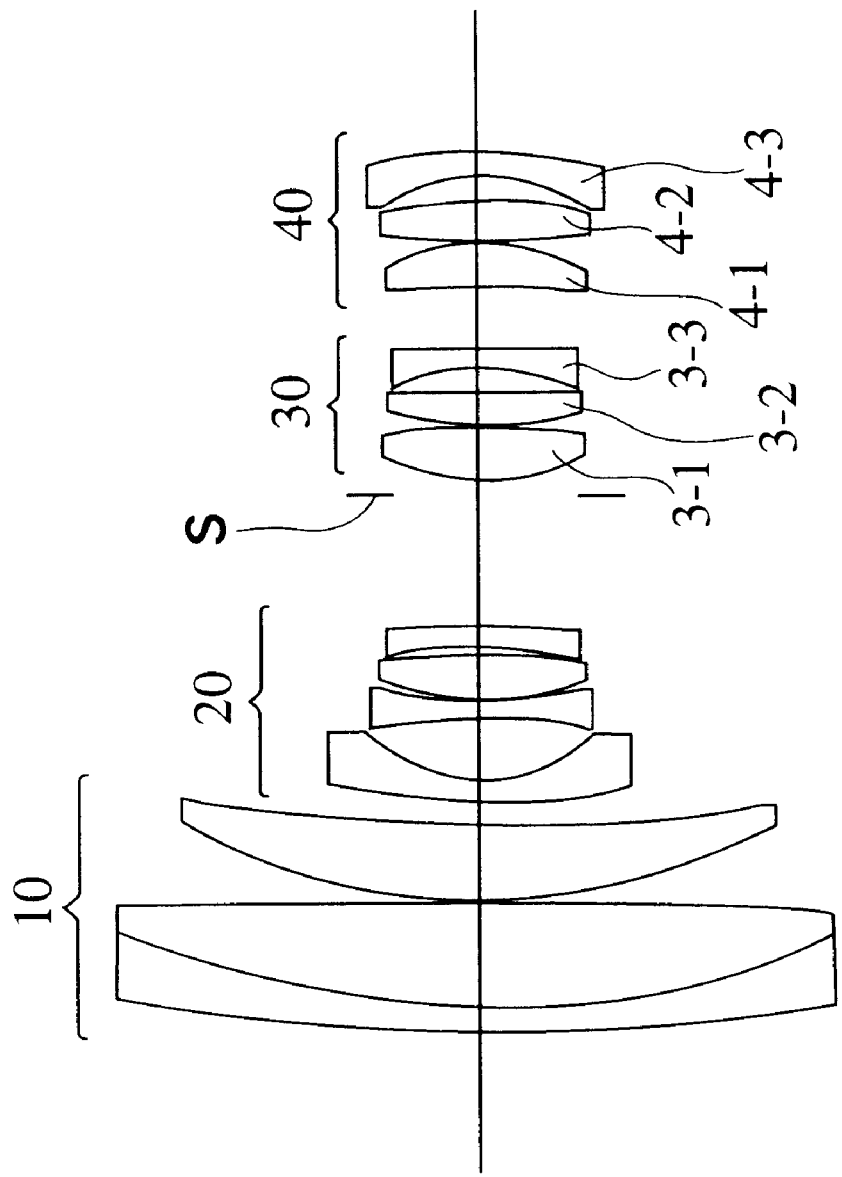
FIG. 5 is a lens arrangement of a second embodiment of a zoom lens system according to the present invention.

FIGS. 5 through 8 show the second embodiment of the zoom lens system according to the present invention. FIG. 5 is a lens arrangement of the second embodiment. FIGS. 6A through 6E, FIGS. 7A through 7E, and FIGS. 8A through 8E show aberration diagrams of the lens arrangement of FIG. 5, respectively at the short focal length extremity, at an intermediate focal length, and at the long focal length extremity. Table 2 shows the numerical data thereof. The basic lens arrangement is the same as the first embodiment.

TABLE 2

$F_{NO} = 1:4.1–4.6–5.8$
f = 29.08–49.98–101.33 (Zoom Ratio: 3.48)
W = 37.7–22.8–11.8
$f_B = 38.00–47.66–62.17$

| Surface No. | r | d | Nd | v |
|---|---|---|---|---|
| 1 | 141.790 | 1.80 | 1.84666 | 23.8 |
| 2 | 60.067 | 7.40 | 1.60311 | 60.7 |
| 3 | −773.915 | 0.10 | — | — |
| 4 | 43.203 | 5.30 | 1.69680 | 55.5 |
| 5 | 113.073 | 1.79–15.21–29.04 | — | — |
| 6 | 52.375 | 1..50 | 1.80400 | 46.6 |
| 7 | 11.265 | 4.31 | — | — |
| 8 | −46.907 | 1.30 | 1.80400 | 46.6 |
| 9 | 29.560 | 0.10 | — | — |
| 10 | 19.709 | 3.05 | 1.84666 | 23.8 |
| 11 | −74.140 | 0.80 | — | — |
| 12 | −24.654 | 1.30 | 1.77250 | 49.6 |
| 13 | −198.674 | 9.17–5.37–1.01 | — | — |
| Diaphragm | ∞ | 1.00 | — | — |
| 14 | 17.579 | 3.60 | 1.69680 | 55.5 |
| 15 | −87.318 | 0.10 | — | — |
| 16 | 30.862 | 2.60 | 1.54814 | 45.8 |
| 17 | −67.450 | 1.45 | — | — |
| 18 | −16.506 | 1.50 | 1.84666 | 23.8 |
| 19 | 409.280 | 4.63–3.61–2.81 | — | — |
| 20 | −89.472 | 3.03 | 1.58144 | 40.7 |
| 21 | −13.590 | 0.10 | — | — |
| 22 | 50.451 | 3.00 | 1.48749 | 70.2 |
| 23 | −26.456 | 1.81 | — | — |
| 24 | −11.902 | 1.60 | 1.83481 | 42.7 |
| 25 | −32.600 | — | — | — |

Embodiment 3

Figure 9:
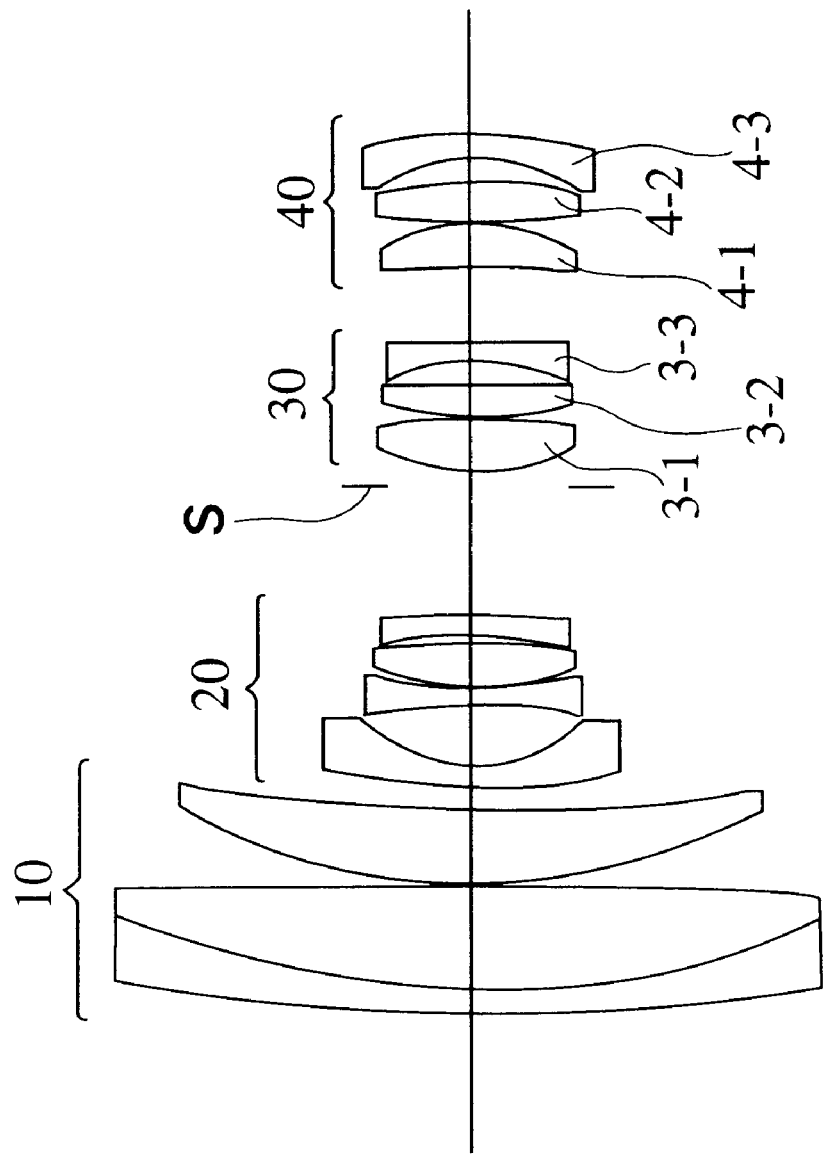
FIG. 9 is a lens arrangement of a third embodiment of a zoom lens system according to the present invention.
Figure 10:
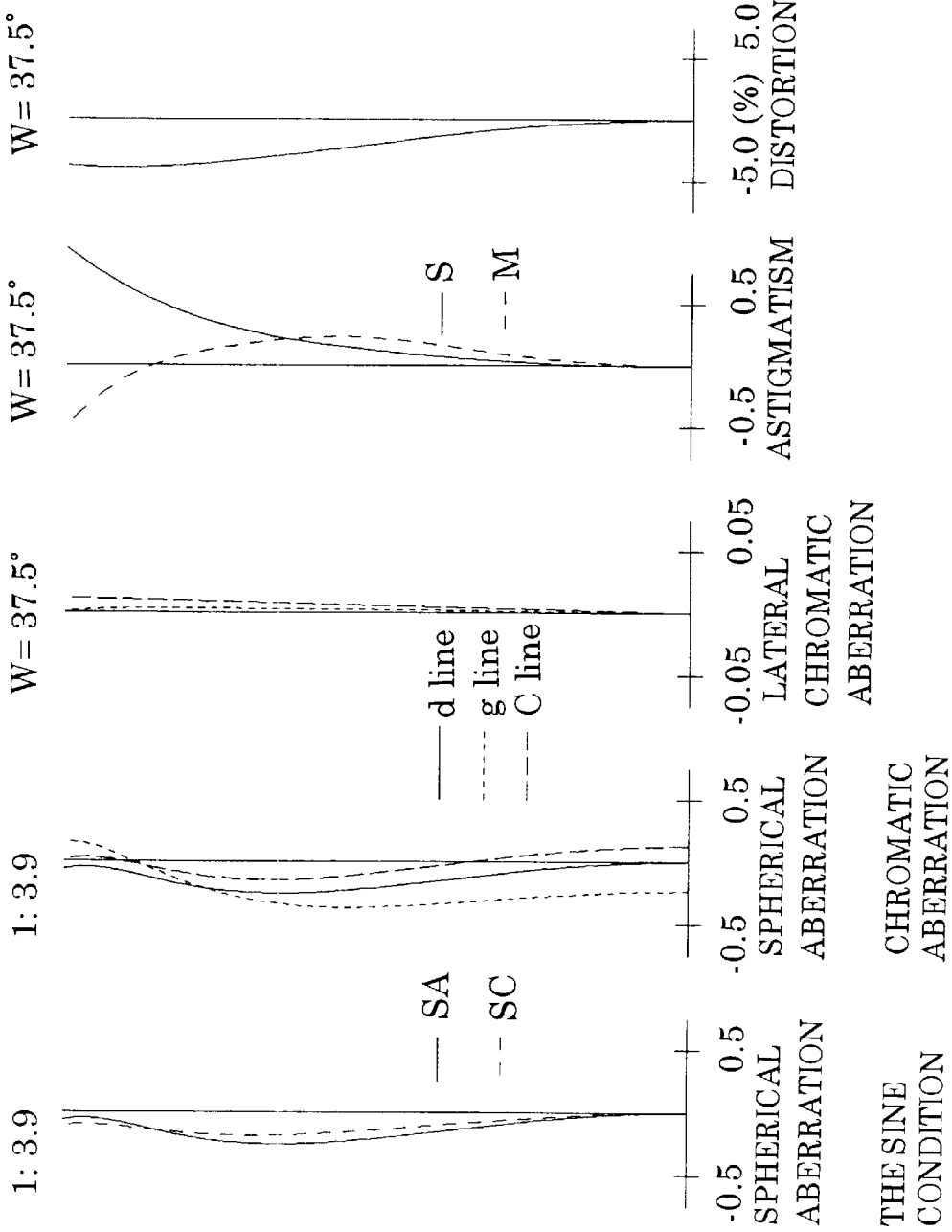
FIGS. 10A, 10B, 10C, 10D and 10E are aberration diagrams of the lens arrangement shown in FIG. 9 at the short focal length extremity.
Figure 11:
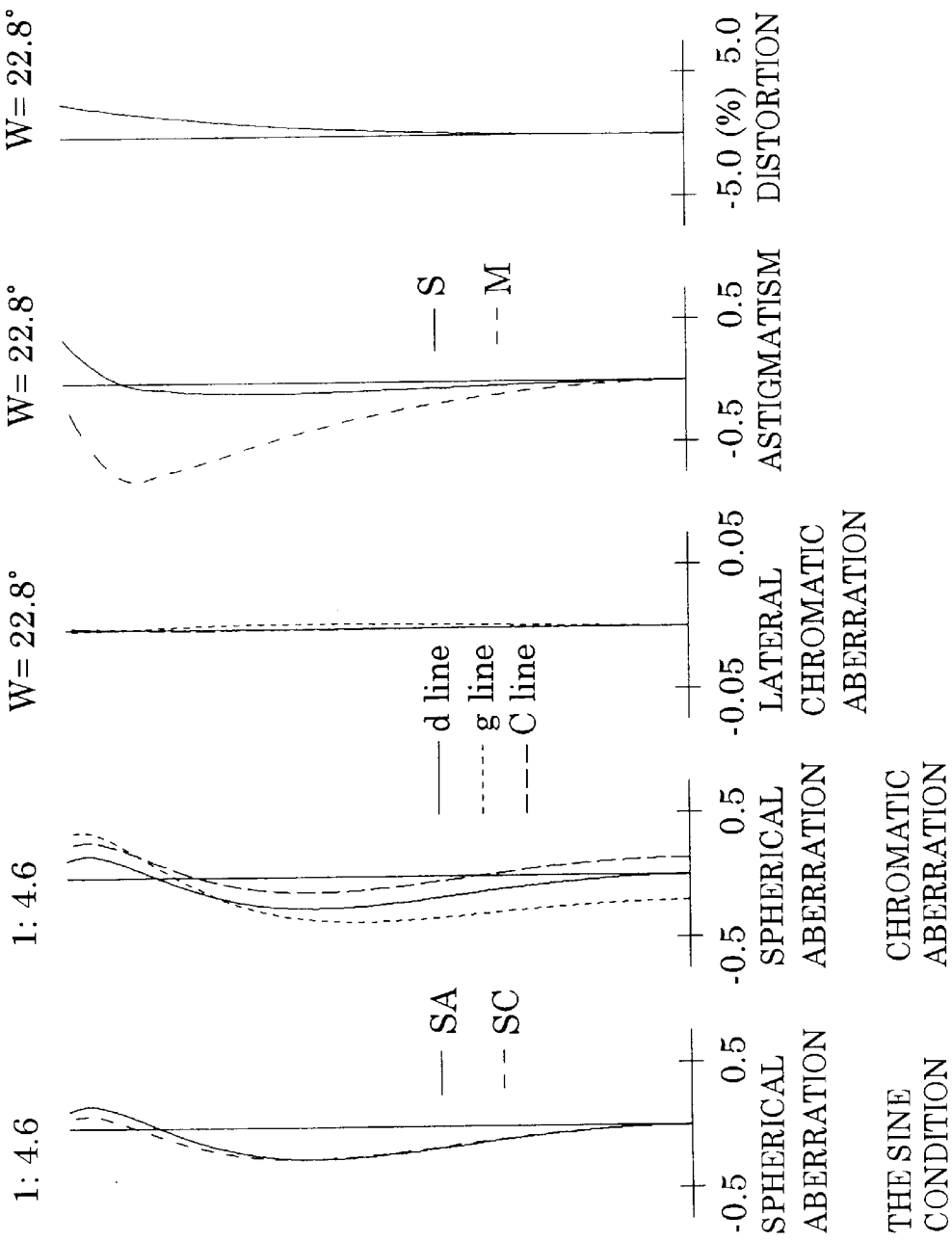
FIGS. 11A, 11B, 11C, 11D and 11E are aberration diagrams of the lens arrangement shown in FIG. 9 at an intermediate focal length.
Figure 12:
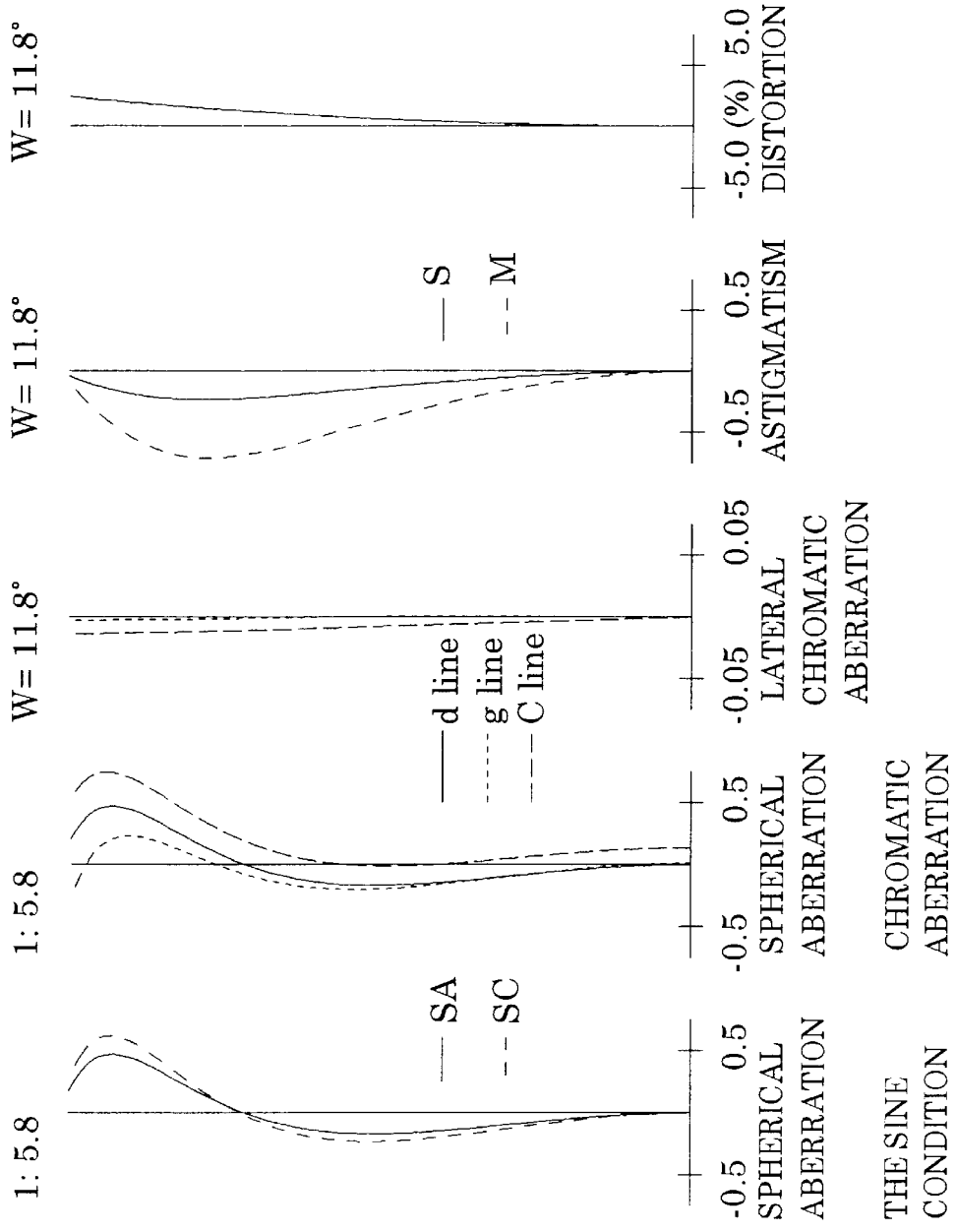
FIGS. 12A, 12B, 12C, 12D and 12E are aberration diagrams of the lens arrangement shown in FIG. 9 at the long focal length extremity.

FIGS. 9 through 12 show the third embodiment of the zoom lens system according to the present invention. FIG. 9 is a lens arrangement of the third embodiment. Figures 10A through 10E, FIGS. 11A through 11E, and Figures 12A through 12E show aberration diagrams of the lens arrangement of FIG. 9, respectively at the short focal length extremity, at an intermediate focal length, and at the long focal length extremity. Table 3 shows the numerical data thereof. The basic lens arrangement is the same as the first embodiment.

TABLE 3

$F_{NO}$ = 1:3.9–4.6–5.8
f = 29.28–50.01–101.33 (Zoom Ratio: 3.46)
W = 37.5–22.8–11.8
$f_B$ = 38.50–47.96–64.96

| Surface No. | r | d | Nd | ν |
|---|---|---|---|---|
| 1 | 164.238 | 1.80 | 1.84666 | 23.8 |
| 2 | 62.621 | 7.39 | 1.60311 | 60.7 |
| 3 | −412.086 | 0.10 | — | — |
| 4 | 41.619 | 5.69 | 1.69680 | 55.5 |
| 5 | 114.183 | 1.76–14.58–26.46 | — | — |
| 6 | 68.168 | 1.50 | 1.80400 | 46.6 |
| 7 | 11.191 | 4.52 | — | — |
| 8 | −37.416 | 1.30 | 1.80400 | 46.6 |
| 9 | 54.554 | 0.10 | — | — |
| 10 | 21.587 | 3.05 | 1.84666 | 23.8 |
| 11 | −61.158 | 0.41 | — | — |
| 12 | −35.634 | 1.30 | 1.77250 | 49.6 |
| 13 | 72.639 | 9.15–5.47–1.00 | — | — |
| Diaphragm | ∞ | 1.00 | — | — |
| 14 | 17.263 | 3.54 | 1.58913 | 61.2 |
| 15 | −83.741 | 0.10 | — | — |
| 16 | 20.846 | 2.35 | 1.58913 | 61.2 |
| 17 | 58.039 | 1.85 | — | — |
| 18 | −18.361 | 1.50 | 1.84666 | 23.8 |
| 19 | −68.675 | 5.33–4.18–3.40 | — | — |
| 20 | −111.478 | 3.03 | 1.51742 | 52.4 |
| 21 | −14.686 | 0.10 | — | — |
| 22 | 39.309 | 3.01 | 1.51742 | 52.4 |
| 23 | −37.768 | 2.06 | — | — |
| 24 | −12.065 | 1.60 | 1.83400 | 37.2 |
| 25 | −30.273 | — | — | — |

Table 4 shows the numerical values of each condition of each embodiment.

TABLE 4

| | Embod. 1 | Embod. 2 | Embod. 3 |
|---|---|---|---|
| Condition (1) | −1.569 | −1.492 | −1.350 |
| Condition (2) | −1.508 | −1.436 | −1.566 |
| Condition (3) | −2.451 | −2.636 | −1.939 |

As can be understood from Table 4, each embodiment satisfies each condition. Furthermore, as can be understood from the aberration diagrams, the various aberrations are adequately corrected even though an aspherical lens surface is not utilized.

According to the present invention, a four-lens-group zoom lens system, with a small number of lens elements, which has high optical performance and is inexpensive, can be obtained.

What is claimed is:

1. A zoom lens system comprising a positive first lens group, a negative second lens group, a positive third lens group, and a positive fourth lens group, in this order from an object;

wherein upon zooming from the short focal length extremity to the long focal length extremity, said first through fourth lens groups move toward said object so that the distance between said first and said second lens groups becomes longer, the distance between said second and said third lens groups becomes shorter, and the distance between said third and said fourth lens groups becomes shorter;

wherein said third lens group comprises a positive 3-1st lens element, a positive 3-2nd lens element having a large-curvature convex surface facing toward said object, and a negative 3-3rd lens element having a large-curvature concave surface facing toward said object, in this order from said object; and wherein said zoom lens system satisfies the following condition:

$$-1.8 < \varnothing r_{3\text{-}3\text{-}1} / \varnothing w < -1.1.$$

wherein $\varnothing r_{3\text{-}3\text{-}1}$ designates the surface power of the object-side surface of said negative 3-3rd lens element of said third lens group; and $\varnothing w$ designates the power of the entire lens system at the short focal length extremity.

2. The zoom lens system according to claim 1, wherein said fourth lens group comprises a positive 4-1st lens element having a large-curvature convex surface facing toward an image, a positive 4-2nd lens element, and a negative 4-3rd lens element having a large-curvature concave surface facing toward said object, in this order from said object; and wherein said zoom lens system satisfies the following condition:

$$-1.8 < \varnothing 4air / \varnothing w < -1.2.$$

wherein $\varnothing 4air = \varnothing_{4\text{-}2\text{-}2} + \varnothing_{4\text{-}3\text{-}1} - d_{4\text{-}4} \times \varnothing_{4\text{-}2\text{-}2} \times \varnothing_{4\text{-}3\text{-}1}$ $\varnothing_{4\text{-}2\text{-}2} = (1-n_{4\text{-}2})/r_{4\text{-}2\text{-}2}$ $\varnothing_{4\text{-}3\text{-}1} = (n_{4\text{-}3}-1)/r_{4\text{-}3\text{-}1}$ $d_{4\text{-}4}$ designates the distance between the positive 4-2nd lens element and the negative 4-3rd lens element;

$n_{4\text{-}2}$ designates the refractive index of said positive 4-2nd lens element;

$n_{4\text{-}3}$ designates the refractive index of said negative 4-3rd lens element;

$r_{4\text{-}2\text{-}2}$ designates the radius of curvature of the image-side surface of said positive 4-2nd lens element, and $r_{4\text{-}3\text{-}1}$ designates the radius of curvature of the object-side surface of said negative 4-3rd lens element.

3. The zoom lens system according to claim 1, wherein said fourth lens group comprises a positive 4-1st lens element having a large-curvature convey surface facing toward an image, a positive 4-2nd lens element, and a negative 4-3rd lens element having a large-curvature concave surface facing toward said object, in this order from said object; and wherein said zoom lens system satisfies the following condition:

$$SF4air < -1.1$$

wherein $$SF4air = (r_{4-3-1} + r_{4-2-2})/(r_{4-3-1} - r_{4-2-2});$$

$r_{4-2-2}$ designates the radius of curvature of the image-side surface of said positive 4-2nd lens element; and $r_{4-3-1}$ designates the radius of curvature of the object-side surface of the said negative 4-3rd lens element.

4. The zoom lens system according to claim 1, wherein upon focusing, said second lens group is moved toward the object.

5. The zoom lens system according to claim 2, wherein said fourth lens group comprises a positive 4-1st lens element having a large-curvature convex surface facing toward an image, a positive 4-2nd lens element, and a negative 4-3rd lens element having a large-curvature concave surface facing toward said object, in this order from said object; and wherein said zoom lens system satisfies the following condition:

$$SF4air < -1.1$$

wherein $$SF4air = (r_{4-3-1} + r_{4-2-2})/(r_{4-3-1} - r_{4-2-2});$$

$r_{4-2-2}$ designates the radius of curvature of the image-side surface of said positive 4-2nd lens element; and $r_{4-3-1}$ designates the radius of curvature of the object-side surface of the said negative 4-3rd lens element.

* * * * *